United States Patent
Edwards

(10) Patent No.: US 9,861,928 B2
(45) Date of Patent: Jan. 9, 2018

(54) METHOD FOR CONTROLLING TWO CONTAMINANTS IN A GAS STREAM

(71) Applicant: VitalAire Canada, Mississauga (CA)

(72) Inventor: Paul Edwards, Mississauga (CA)

(73) Assignee: VitalAire Canada Inc., Mississauga, Ontario (CA)

(*) Notice: Subject to any disclaimer, the term of this patent is extended or adjusted under 35 U.S.C. 154(b) by 25 days.

(21) Appl. No.: 15/171,685

(22) Filed: Jun. 2, 2016

(65) Prior Publication Data

US 2017/0348629 A1 Dec. 7, 2017

(51) Int. Cl.
*B01D 53/04* (2006.01)
*B01D 53/26* (2006.01)

(52) U.S. Cl.
CPC .... *B01D 53/0454* (2013.01); *B01D 2253/104* (2013.01); *B01D 2253/116* (2013.01); *B01D 2257/504* (2013.01); *B01D 2257/80* (2013.01)

(58) Field of Classification Search
CPC .......... B01D 53/0454; B01D 2253/104; B01D 2253/116; B01D 2257/504; B01D 2257/80
USPC .................. 95/8, 10, 11, 117, 139, 122, 148
See application file for complete search history.

(56) References Cited

U.S. PATENT DOCUMENTS

| | | | |
|---|---|---|---|
| 4,552,570 A * | 11/1985 | Gravatt | B01D 53/0407 95/10 |
| 5,917,135 A * | 6/1999 | Michaels | B01D 53/047 95/101 |
| 8,794,237 B2 * | 8/2014 | Wilkinson | A61M 16/10 128/200.24 |
| 9,266,053 B2 | 2/2016 | Shelnutt et al. | |
| 2012/0055477 A1 * | 3/2012 | Wilkinson | C01B 13/0259 128/204.23 |
| 2017/0014755 A1 | 1/2017 | Harm et al. | |

FOREIGN PATENT DOCUMENTS

CA 2 866 715 9/2013

OTHER PUBLICATIONS

International Search Report and Written Opinion for corresponding PCT/IB2017/053292, dated Sep. 22, 2017.

* cited by examiner

*Primary Examiner* — Frank Lawrence
(74) *Attorney, Agent, or Firm* — Elwood L. Haynes

(57) ABSTRACT

A method for controlling two contaminants in a gas stream, comprising a system with two adsorption vessels, and analyzers for determining the concentration of the two contaminants is provided. The method includes purifying a gas stream with a first vessel placed in an adsorption mode and placing a second vessel in a standby mode. Then opening a second purge valve on the second vessel if the concentration of either contaminant is equal to or greater than predetermined threshold levels, thereby allowing a first portion of the purified gas exiting the first vessel to flow through the second vessel and exiting through the second purge valve. Then closing the second purge valve after a predetermined period of time when the concentration of both contaminants are less than or equal to a predetermined threshold level. Then switching the vessels and repeating the process.

12 Claims, 4 Drawing Sheets

METHOD FOR CONTROLLING TWO CONTAMINANTS IN A GAS STREAM

BACKGROUND

A compressed air dryer is used for removing water vapor from compressed air. Compressed air dryers are commonly found in a wide range of industrial and commercial facilities. The process of air compression concentrates atmospheric contaminants, including water vapor. This raises the dewpoint of the compressed air relative to free atmospheric air and leads to condensation within pipes as the compressed air cools downstream of the compressor.

Excessive water in compressed air, in either the liquid or vapor phase, can cause a variety of operational problems for users of compressed air. These include freezing of outdoor air lines, corrosion in piping and equipment, malfunctioning of pneumatic process control instruments, fouling of processes and products, and more.

There are various types of compressed air dryers. Their performance characteristics are typically defined by the dewpoint. The primary types of dryers are regenerative desiccant dryers, often called "twin tower" dryers; refrigerated dryers; deliquescent dryers; and membrane dryers.

The most common moisture removal technology employed with on-site medical air application is heatless regenerative desiccant dryers. These dryers typically comprise of two vessels charged with activated alumina (silicon), and are operated on a timed switching basis whereby one dryer removes moisture from the process air whilst the other dryer purges to regenerate. When the preset time interval is reached, the process air flow switches from the active tower to the stand-by tower and the active tower purges to remove accumulated moisture. Typically, a portion of the dried air (5-15%) is used to back-flush the off-line dryer.

While this operating method does a good job of removing moisture from the process air, the volume of purge air required places unnecessary demand on compressor systems during periods of low demand for the process air. To reduce power consumption and limit compressor wear, most desiccant dryers deployed for the medical air application are designed to control purging based upon measured dewpoint. In this case, the purge valve on the stand-by tower remains closed until the process air dewpoint reaches a pre-determined level. The towers continue to switch on a timed basis, thus loading with moisture equally until the purge activation dewpoint is reached and the purging cycles begin.

A previously unrecognized side effect of this desiccation process has been identified by the inventor. It has been discovered that traditional desiccant dryer operating methods contribute to variable $CO_2$ levels within the process air, and in certain cases measurements indicate $CO_2$ levels exceeding the United States Pharmacopeial Convention (USP) limit of 500 ppm. Therefore, there is a need in the industry to address the need to limit both dewpoint and $CO_2$ levels in dried medical air applications.

SUMMARY

A method for controlling two contaminants in a gas stream, comprising a system with two adsorption vessels, and analyzers for determining the concentration of the two contaminants is provided. The method includes purifying a gas stream with a first vessel placed in an adsorption mode and placing a second vessel in a standby mode. Then opening a second purge valve on the second vessel if the concentration of either contaminant is equal to or greater than predetermined threshold levels, thereby allowing a first portion of the purified gas exiting the first vessel to flow through the second vessel and exiting through the second purge valve. Then closing the second purge valve after a predetermined period of time when the concentration of both contaminants are less than or equal to a predetermined threshold level. Then switching the vessels and repeating the process.

DESCRIPTION OF PREFERRED EMBODIMENTS

Figure 1:
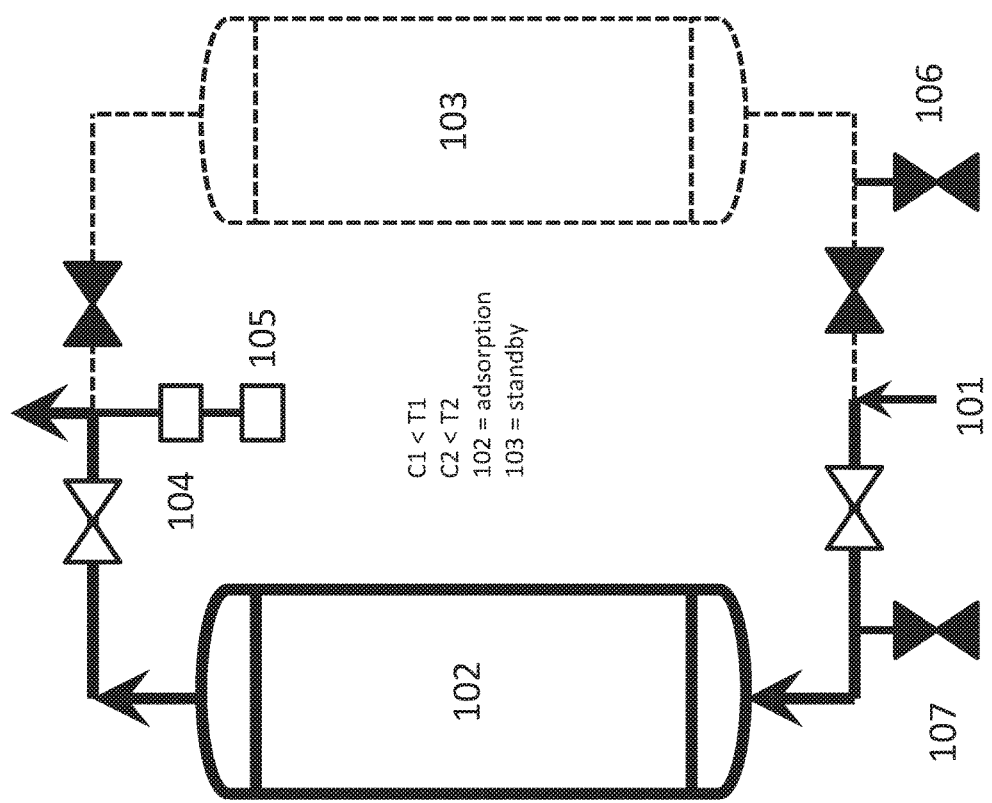
FIG. 1 is a schematic representation in which a first vessel is in adsorption mode and a second vessel is in standby mode, in accordance with one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure In addition to moisture removal, activated alumina is well known for its capacity to remove carbon dioxide from process air. The inventor has noted that as the dewpoint of the process air warms up, the level of $CO_2$ passing through the active dryer increases, and depending upon the time delay before reaching the dewpoint based purge activation set-point, the level of $CO_2$ may eclipse the USP limit.

It is also well understood that due to its molar weight and viscosity, $CO_2$ may travel through a pipeline in bolus form, and may not homogenize or dilute within the process air while travelling through a pipeline. As a result, it is possible to have short term bursts of $CO_2$ enriched air dispensed through medical air terminal units. Although the concentration of $CO_2$ is generally not considered unsafe vis-à-vis $CO_2$ poisoning, the short term displacement of oxygen (i.e. anoxia) in the medical air used for patient treatment can be extremely hazardous, especially for neonates with under developed lungs.

The $CO_2$ levels in outdoor air (i.e. the source for medical air) may vary depending upon nearby industrial activities and prevailing winds, and the level of $CO_2$ measured after the active dryer does not always surpass the USP limit before the dryer begins to purge. Therefore simply lowering the dewpoint based purge activation set-point will not guarantee $CO_2$ levels below the USP limit.

It is furthermore noted that the global ground level levels of CO2 are on the rise, and are expected to surpass the USP limit in coming years, making it all the more important to carefully manage this contaminant to ensure patients are treated with a product meeting the USP specification.

With the objective of ensuring the process air emitting from a heatless regenerative desiccant dryer consistently meets the dewpoint and $CO_2$ specifications of Medical Air USP, a method involving initiating desiccant dryer purge based on continuous measurements of both moisture and $CO_2$, and dryer purge activation on a whichever limit is reached first basis, thus assuring the operator that both contaminants are managed within the USP specification is provided.

Turning to FIG. 1, a first adsorption vessel 102 and a second absorption vessel 103 is provided. There is a first analyzer 104 for determining the concentration C1 of the first impurity, and a second analyzer 105 for determining the concentration C2 of the second impurity. The gas stream 101 is purified with the first vessel 102 placed in an adsorption mode and placing the second vessel 103 in a standby mode.

In normal operation, first vessel 102 continues in adsorption mode until a predetermined time period is expired, at which time first vessel 102 will go into standby mode and second vessel 103 is placed into adsorption mode. This switching process continues until the concentrations of either C1 or C2 equals or exceeds predetermined thresholds.

Figure 2:
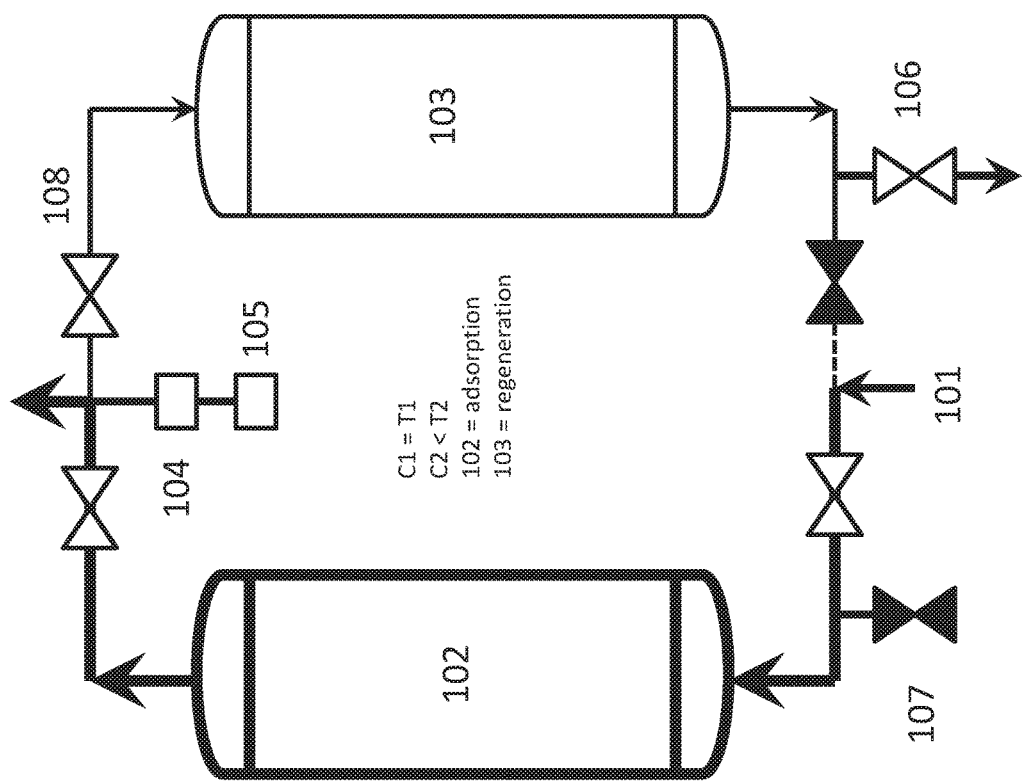
FIG. 2 is a schematic representation in which a first vessel is in adsorption mode and a second vessel is in regeneration mode, in accordance with one embodiment of the present invention.

Turning to FIG. 2, if the concentration of either the first impurity C1 is equal to or greater than a first predetermined threshold level T1, or the second impurity C2 is equal to or greater than a second predetermined threshold level T2, a second purge valve 106 on the contaminated vessel (in this example the second vessel 103) is opened. This allows a first portion 108 of the purified gas exiting the first vessel 102 to flow through the second vessel 103 and exit through the second purge valve 106. The first portion 108 of the purified air may be between 5% and 15% of the total air exiting the first vessel 102. The second purge valve 106 is closed after a predetermined period of time or when the concentration both the first impurity C1 is equal to or less than a third predetermined threshold level T3, or the second impurity C2 is equal to or less than a fourth predetermined threshold level T4. The dryer which is processing the gas stream 101, will never be in standby or regeneration (purge) mode. If the predetermined time for vessel switching arrives, and at least one of the impurities is at a concentration that is greater than the minimum reset value (T3 or T4), the time will be extended. The active vessel will continue adsorbing until the minimum reset value (T3 or T4) is achieved, at which time the vessels switch.

Figure 3:
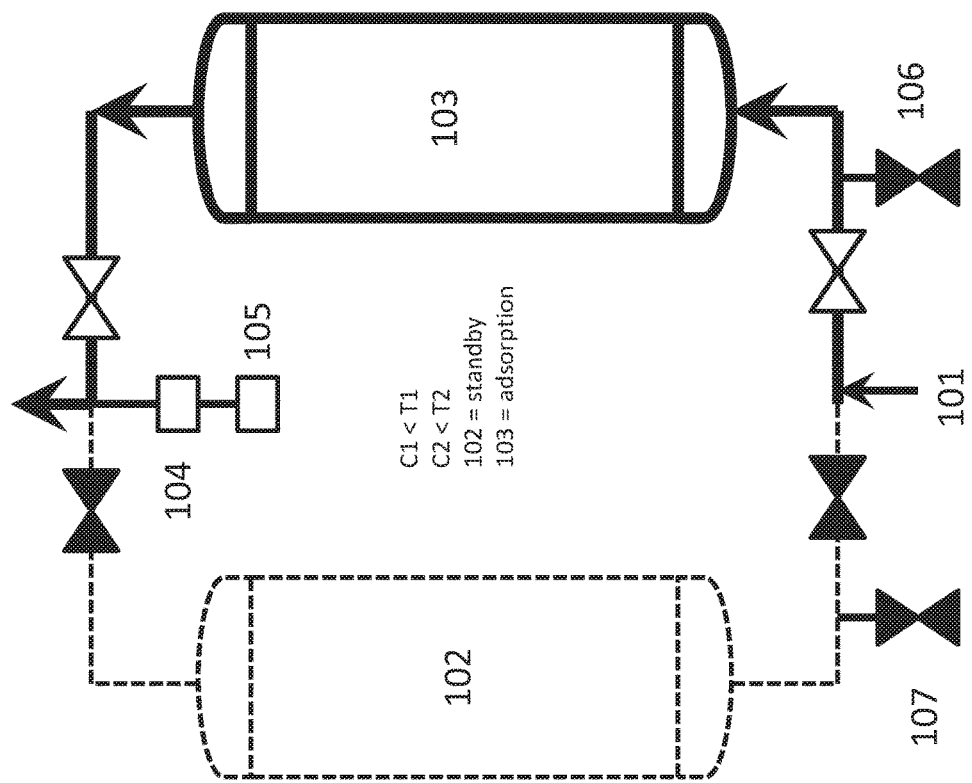
FIG. 3 is a schematic representation in which a first vessel is in standby mode and a second vessel is in adsorption mode, in accordance with one embodiment of the present invention.
Figure 4:
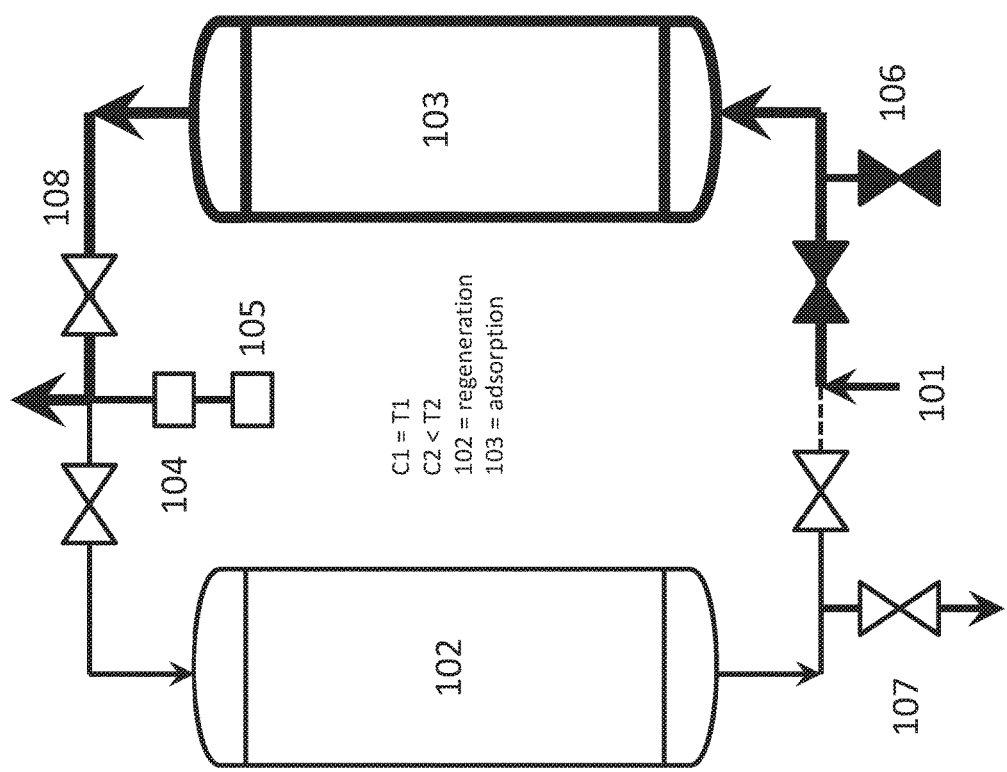
FIG. 4 is a schematic representation in which a first vessel is in regeneration mode and a second vessel is in adsorption mode, in accordance with one embodiment of the present invention.

Turning to FIG. 3, the gas stream is then purified with the second vessel 103 placed in an adsorption mode and the first vessel 102 in a standby mode. Then, as indicated in FIG. 4, if the concentration either the first impurity C1 is equal to or greater than a first predetermined threshold level T1, or the second impurity C2 is equal to or greater than a second predetermined threshold level T2, a first purge valve 107 on the first vessel 102 is opened. The first purge valve is closed after the predetermined period of time or when the concentration both the first impurity C1 is equal to or less than a third predetermined threshold level T3, or the second impurity C2 is equal to or less than a fourth predetermined threshold level T4. The entire process then repeats.

In one embodiment of the present invention, the gas stream is air. The adsorption vessels may utilize activated alumina, or a combination of activated alumina and a molecular sieve, as the adsorbent. The first contaminant may be water and the second contaminant may be carbon dioxide.

The first predetermined threshold level T1 of impurities, for water, may be a dewpoint of −10 degrees centigrade to −40 degrees centigrade, or preferably a maximum dewpoint of −40 degrees centigrade.

The second predetermined threshold level T2 of impurities, for carbon dioxide, may be between 200 ppm and 450 ppm, or preferably may be between 350 ppm and 425 ppm, and more preferably may be less than 500 ppm.

The third predetermined threshold level T3 of impurities, for water, may be a dewpoint of less than −60 degrees centigrade, preferably less than 65 degrees centigrade, more preferably less than 70 degrees centigrade.

The fourth predetermined threshold level T4 of impurities, for carbon dioxide, may be less than 50 ppm, preferably less than 25 ppm, and more preferably less than 10 ppm.

Neither the first portion of dried gas nor the second portion of purified gas may be heated by an external source. The first predetermined period of time may be between 2 minutes and 20 minutes.

The invention claimed is:

1. A method for controlling two contaminants in a gas stream, using a system with two adsorption vessels, and analyzers for determining the concentration of the two contaminants, the method comprising:
   A. purifying a gas stream with a first vessel placed in an adsorption mode and placing a second vessel in a standby mode,
   B. opening a second purge valve on the second vessel:
     a. if the concentration of the first contaminant is equal to or greater than a first predetermined threshold level or
     b. if the concentration of the second contaminant is equal to or greater than a second predetermined threshold level,
     thereby placing the second vessel in regeneration mode, thereby allowing a first portion of the purified gas exiting the first vessel to flow through the second vessel and exiting through the second purge valve,
   C. closing the second purge valve when:
     a. the concentration of the first contaminant is less than or equal to a third predetermined threshold level and
     b. the concentration of the second contaminant is less than or equal to a fourth predetermined threshold level,
   D. purifying the gas stream with, after a predetermined period of time:
     a. the second vessel if the second purge valve is closed, and placing the first vessel in standby mode, or
     b. the first vessel if the second purge valve is open, and maintaining the second vessel in regeneration mode,
   E. returning to step C until the second purge valve is closed;

F. opening a first purge valve on the first vessel:
   a. if the concentration of the first contaminant is equal to or greater than the first predetermined threshold level or
   b. if the concentration of the second contaminant is equal to or greater than the second predetermined threshold level,
   thereby placing the first vessel in regeneration mode, thereby allowing a second portion of the purified gas exiting the second vessel to flow through the first vessel and exiting through the first purge valve,
G. closing the first purge valve when:
   a. the concentration of the first contaminant is less than or equal to the third predetermined threshold level and
   b. the concentration of the second contaminant is less than or equal to the fourth predetermined threshold level,
H. purifying the gas stream with, after a predetermined period of time:
   a. the first vessel if the first purge valve is closed, and placing the second vessel in standby mode, or
   b. the second vessel if the first purge valve is open, and maintaining the first vessel in regeneration mode,
I. returning to step G until the first purge valve is closed;
J. returning to step A.

2. The method of claim 1, wherein the gas stream is air.

3. The method of claim 1, wherein the adsorption vessels utilize activated alumina as the adsorbent.

4. The method of claim 1, wherein the adsorption vessels utilize a combination of activated alumina and a molecular sieve.

5. The method of claim 1, wherein the first contaminant is water and the second contaminant is carbon dioxide.

6. The method of claim 5, wherein the predetermined threshold level of contaminants for carbon dioxide is between 200 ppm and 450 ppm.

7. The method of claim 5, wherein the predetermined threshold level of contaminants for carbon dioxide is between 350 ppm and 425 ppm.

8. The method of claim 5, wherein the predetermined threshold level of contaminants for carbon dioxide is less than 500 ppm.

9. The method of claim 5, wherein the predetermined threshold level of contaminants for water is a dewpoint of −10 degrees centigrade to −40 degrees centigrade.

10. The method of claim 5, wherein the predetermined threshold level of contaminants for water is a maximum dewpoint of −40 degrees centigrade.

11. The method of claim 1, wherein neither the first portion of dried gas nor the second portion of purified gas is heated by an external source.

12. The method of claim 1, wherein the predetermined period of time is between 2 minutes and 20 minutes.

* * * * *